United States Patent [19]
Hazelhurst

[11] 3,786,410
[45] Jan. 15, 1974

[54] SEISMIC CABLE ASSEMBLY

[75] Inventor: Gerald D. Hazelhurst, Houston, Tex.

[73] Assignee: Mark Products, Inc., Houston, Tex.

[22] Filed: Dec. 27, 1971

[21] Appl. No.: 212,267

[52] U.S. Cl.......... 340/17, 340/15, 285/2, 339/80
[51] Int. Cl............................................. G01v 1/16
[58] Field of Search ............ 340/17, 7 R; 285/2, 285/3; 287/80; 24/123 A; 349/80; 114/235 A; 174/70 R; 74/501

[56] References Cited
UNITED STATES PATENTS

| | | | |
|---|---|---|---|
| 3,387,863 | 6/1968 | Treese | 285/2 |
| 2,856,594 | 10/1958 | McLoad | 340/17 |
| 3,435,410 | 3/1969 | Babb | 340/7 R |
| 3,486,397 | 12/1969 | Roock et al. | 74/501 R |
| 2,649,579 | 8/1953 | Alexander | 340/17 |

Primary Examiner—Maynard R. Wilbur
Assistant Examiner—Denis H. McCabe
Attorney—W. F. Hyer et al.

[57] ABSTRACT

The seismic cable assembly disclosed is made up of a plurality of lengths of cable with each link having a plurality of electrical conductors and a tensile member extending throughout its length. The lengths of cable are strung end to end and the adjacent ends of each of the lengths are connected together by connectors that connect the tensile members of adjacent cable lengths. In this way, the entire cable assembly can be moved from position to position by dragging the assembly along the ground with the load imposed on the cable by the friction between the ground, and the cable being transmitted to the towing vehicle through the tensile members. The cable assembly is connected to the towing vehicle by a connector assembly that includes a shear pin designed to fail when the force required to move the cable assembly reaches a predetermiend amount. This protects the cable from damage should it hang up as it is being dragged along the ground. The geophones and the connectors between the lengths of cable are enclosed in housings to provide smooth surfaces for sliding across the ground, and in the case of the geophones, to add weight to the geophone to improve its contact with the ground.

4 Claims, 8 Drawing Figures

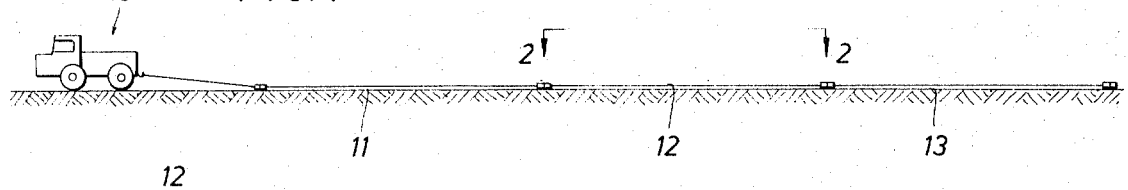
FIG. 1
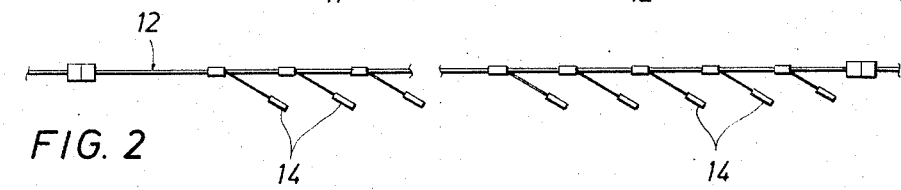
FIG. 2
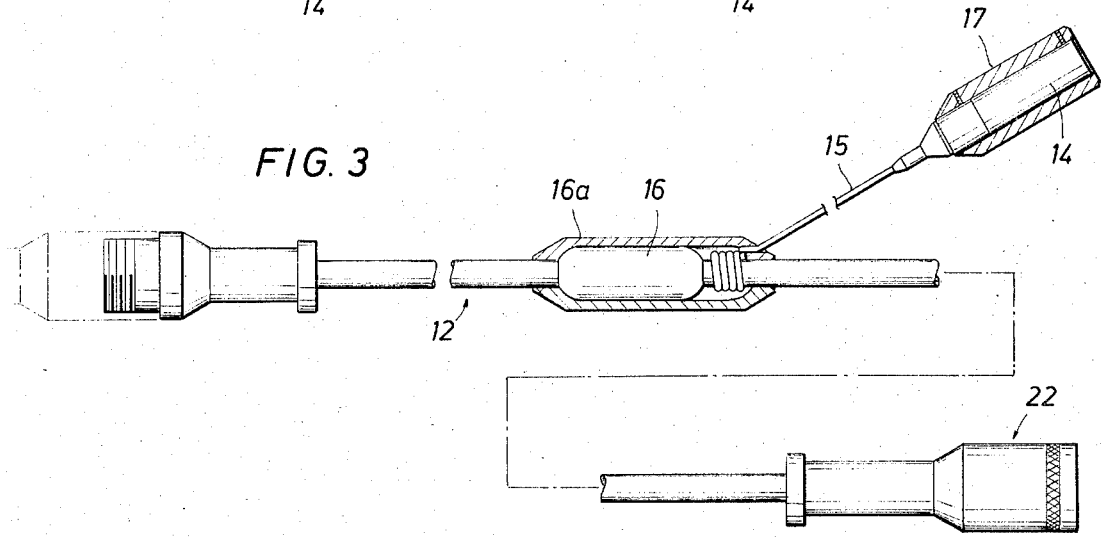
FIG. 3
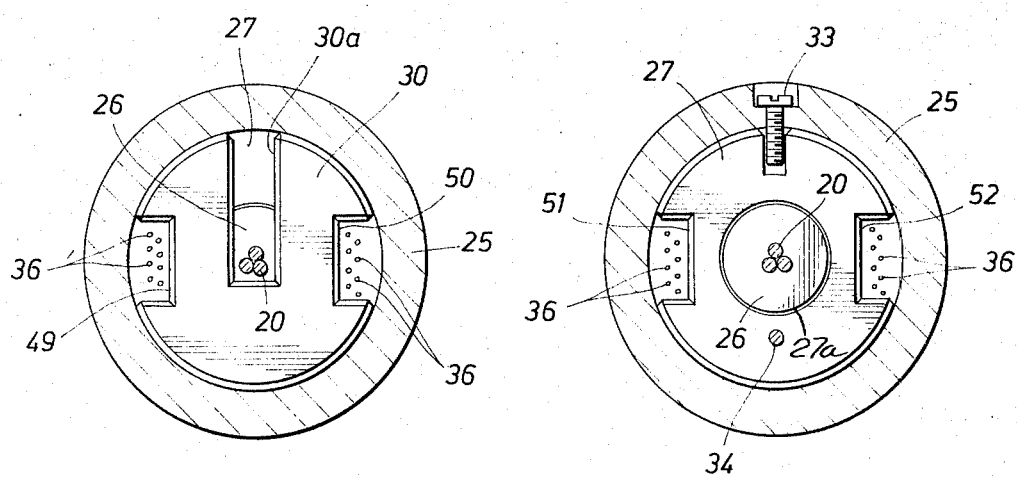
FIG. 5
FIG. 6

SEISMIC CABLE ASSEMBLY

This invention relates to seismic cable assemblies that include a multiconductor cable assembly having a plurality of groups of geophones connected thereto that are spaced along the ground to detect seismic signals produced in the ground.

Usually, in seismic survey work, a plurality of groups of geophones are spaced apart along a predetermined line. Each group of geophones is located at what is commonly called a "stake point". These stake points are preselected and located by survey crews that precede the seismic crew into the area. During the survey, the geophones are moved from stake point to stake point. Usually, seismic cable assemblies are made up of a plurality of lengths of cable connected together. Each length of cable has one or more groups of geophones connected thereto. To move the cable assembly, the usual practice is to disconnect all of the lengths and physically carry each length ahead to the next location where all of the lengths would be reassembled with the geophones located at the proper stake points. Since each length of cable may be eight hundred feet or more in length, and there may be 10 to 12 of such lengths connected together to make up the entire assembly, it is clear that the work of moving the cable assembly length by length is a laborious and time consuming operation.

Therefore, it is an object of this invention to provide a cable assembly for use in seismic work that can be pulled along the ground from one position to another without being disassembled.

It is another object of this invention to provide such a seismic cable assembly that includes lengths of cable that are assembled together to make up the seismic cable assembly with each length having a tensile member extending throughout its length and connector portions on each end for connecting to connector portions on the ends of the adjacent lengths to connect the tensile members on the connected lengths to transmit the tensile force imposed on the tensile member of a trailing length to the tensile member of the leading length as the cable is pulled along the ground.

It is a further object of this invention to provide connector means for connecting the cable assembly to the towing vehicle that will disconnect the cable assembly from the towing vehicle when the towing force or the drag imposed on the vehicle by the cable reaches a predetermined amount to avoid the possibility of damaging the cable assembly should it or a geophone connected thereto hang-up while the cable assembly is being moved along the ground.

These and other objects, advantages, and features of this invention will be apparent to those skilled in the art from a consideration of this specification, including the appended claims and attached drawings.

The preferred embodiment of the invention will now be described in connection with drawings, in which:

FIG. 1 is a side view in elevation of the cable assembly of this invention being dragged along the ground by a towing vehicle;

FIG. 2 is a top view on an enlarged scale of one of the lengths of the cable assembly of FIG. 1, showing a portion of the geophones connected thereto;

FIG. 3 is a view partly in section and partly in elevation and on an enlarged scale of a section of the cable length of FIG. 2 and one geophone;

FIG. 5 is a sectional view taken along line 5—5 of FIG. 4;

FIG. 6 is a sectional view taken along line 6—6 of FIG. 4;

Figure 4:
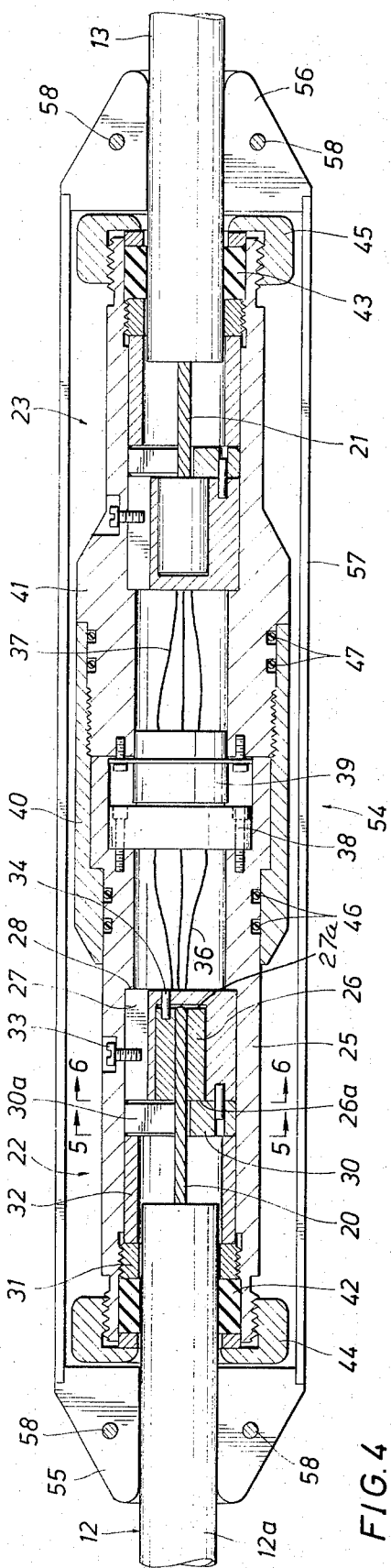
FIG. 4 is a sectional view through the preferred embodiment of the connector employed to connect the adjacent ends of two lengths of cable that make up the cable assembly.

In FIG. 1, the cable assembly of this invention is shown being pulled along the ground by truck 10. The cable assembly includes a plurality of lengths of cable. Lengths 11, 12, and 13 are the only lengths of the cable assembly shown in FIG. 1. As explained above, each length of cable may be eight hundred feet or more in length. Ten or more of such lengths may be connected together to form one seismic cable assembly. Therefore, there is obviously no scalar relationship between the cable lengths of FIG. 1 and truck 10.

FIG. 2 shows length 12 with a plurality of geophones 14 connected thereto. It is common practice to connect the geophones in groups adjacent preselected stake points on the length. For example, if the cable length is 880 feet long, one stake point may be 220 feet from one end and another 220 feet from the other end. The cable then is moved to positon the stake points on the cable at the stake points previously marked.

FIG. 3 shows how one of geophones 14 is connected both physically and electrically to cable length 12 by cable 15. The details of the connection of the electrical conductors in line 15 to the electrical conductors extending through cable 12 is not shown as this plays no part in this invention. This connection, however, is made inside connector 16, the housing of which seals the exposed electrical conductors therein from the surrounding atmosphere. Cable 15 has sufficient tensile strength to drag the geophone along with the cable as the cable is moved over the ground from one position to the other. This force is transmitted to cable 12 by wrapping cable 15 around cable 12 several times, as shown. Outer jacket 16a encloses connector 16 and the wraps of cable to protect them from wear and to give the connection a streamlined outer surface.

Geophone 14 is provided with outer case 17 to accomplish two things. Preferably, in operation, the geophone is held in good firm contact with the ground so that the vibrations that travel through the ground will be transmitted to the geophone with a minimum of loss. Since the geophone cable assembly of this invention will be dragged along the ground from place to place it is important that this good contact be obtained wherever the geophones stop after a move so that the geophones will not have to be placed in position by hand each time they are moved. Therefore, outer case 17 is made of material having a high specific gravity to increase the force that the geophone exerts against the ground thereby improving the connection between the geophone and the ground. In addition, outer case 17 has a streamlined outer surface to reduce the possibility of the geophone hanging up as it is dragged along the ground. Another advantage of outer sheath 17 is that it takes all the wear caused by being dragged along the ground instead of the housing of the geophone.

In accordance with this invention, connecting means are provided for connecting the adjacent ends of the lengths of cable that includes means for electrically connecting the electrical conductors in the two lengths, and means to connect the tensile members of the lengths to transmit the force of moving the trailing length to the tensile member of the pulling length.

The preferred embodiment of the connecting means of this invention is shown in FIG. 4 connecting the adjacent ends of the cable lengths 12 and 13. Each cable is constructed in the same manner. Cable length 12, for example, includes tensile member 20 that extends from one end of the cable length to the other. Similarly, cable length 13 is provided with tensile member 21 that also extends its entire length. These tensile members are wire ropes or the like that are relatively flexible, yet can withstand a substantial tensile load. In order to drag the cable along the ground without damage, the force required to do this must be taken by a tensile member of the type shown and not transmitted in any way to the electrical conductors in the cable or to the outer sheath itself, since neither of these members are designed to withstand such tensile stresses.

The connector shown in FIG. 4, includes first and second connector sections 22 and 23 that are connected to the ends of cable lengths 12 and 13, respectively. Each connector section includes a housing into which the cable length extends, and means for connecting the housing to the tensile member of the cable length to transmit between them all tensile forces imposed thereon. As shown in FIG. 4, connector section 22 includes tubular housing 25 into which the end of cable 12 extends. Outer sheath 12a is cut-away to expose the end of tensile member 20 and also the ends of the electrical conductors. The means for connecting the housing to the tensile member includes lug 26, which as shown in the drawing, is a cylindrical member that is swaged onto the end of tensile member 20. The lug, being cylindrical, provides shoulder 26a that faces away from the end of the tensile member. The lug is located in opening 27a of cylindrical member 27 in housing 25. Preferably, the lug is of such a a diameter that it will fit snugly inside member 27 and thereby be held against lateral movement relative to the housing by the member, which in turn fits snugly in housing 25. Also, the opening into which lug 26 is located does not extend all the way through member 27, therefore forward movement of the lug relative to the member is also limited by the member. The member is positioned against shoulder 28 on the inside of housing 25, which limits the distance the sleeve can move into the housing.

To hold the lug in the sleeve and transmit the force on the housing to the tensile member and vice versa, washer 30 is located adjacent shoulder 26a of the lug, with tensile member 20 extending through opening 30a of the washer member. Externally threaded nut 31 and spacer sleeve 32 combine to anchor washer 30 and lug 26 against movement out of housing 25 and to cause any force imposed on housing 25 tending to pull the housing off the cable to be transmitted to tensile member 20 and vice versa. Machine screw 33 extends into a slot in member 27 to hold it against rotation relative to housing 25 and drive pin 34 extends through the blind end of the opening in member 27 and into lug 26 to hold the lug from rotation relative to the member. It is important that the connector section not rotate relative to the cable, otherwise it would wrap up the electrical conductors and break them.

Means are included in the connector to provide an electrical connection between the electrical conductors in cable length 12 and cable length 13. Usually, there will be a large number of electrical conductors in cables such as these. Such wires are shown schematically by lines 36 and 37 for the conductors in cables 12 and 13, respectively. The electrical connection is provided between the two cables by a pin type connector made up of socket or female member 38 and pin or male member 39. The electrical conductors in each cable length are connected to the portion of the pin connector in its portion of the cable connector. The socket portion of the pin connector is mounted in the forward end of housing 25, as shown in the drawings. The pin member is mounted in housing 41 of section 23 of the cable length connector to mate with the socket connector and complete the electrical connection between the two cables.

When so positioned, connecting sleeve 40 is moved into threaded engagement with the threads on the outer surface of housing 41 of connector section 23. This physically connects the two housings of the connector sections together, which in turn connects the tensile members of the two cable lengths together so that the tensile load imposed, for example, on cable length 13 as it is pulled along the ground will be transmitted directly to the tensile member of cable length 12.

Means are provided to seal the inside of the connector to protect the exposed electrical wires or conductors from the ambient conditions. In the embodiment shown, compression type seal rings 42 and 43 are located adjacent the ends of housing 25 and 41 of the conector sections. Glad nuts 44 and 45 compress seal rings 42 and 43 sufficiently to form a seal between the outer sheaths of the cable lengths and the insides of the housing portions of the connector. O-rings 46 and 47 provide a seal between sleeve 40 and housing 25 and 41, respectively.

As shown in FIGS. 5 and 6, grooves 49 and 50 are provided on opposite sides of washer member 30, and grooves 51 and 52 are provided on opposite sides of cylindrical member 27 to provide passageways for electrical conductors 36 to extend past these members for connection to socket member 38.

After the two sections of the connector are assembled, as shown in FIG. 4, outer sheath or case 54 is assembled around the connector. The view in FIG. 4 shows one-half of the sheath. The half shown includes end members 55 and 56 that are shaped as longitudinally split cones and have a central groove to receive the outer sheath of cable lengths 12 and 13. Sleeve 57, which is split longitudinally, extends between the two end members to enclose one half of the connector. The other half of the sheath is connected to the half shown by bolts 58 extending through the end members of the two halves of the sheath to complete the enclosure of the connector.

Outer sheath 54 serves two functions. First, it provides a streamlined outer surface to reduce the chances that this enlargement in the cable assembly will hang up on rocks, bushes, trees, etc. as the cable assembly is dragged along the ground. In addition, it is designed to protect the connector itself from wear as the cable assembly is dragged along the ground. Preferably, the outer sheath is made of relatively light material, such as aluminum, so that it adds as little as possible to the weight of the cable assembly.

Figure 7:
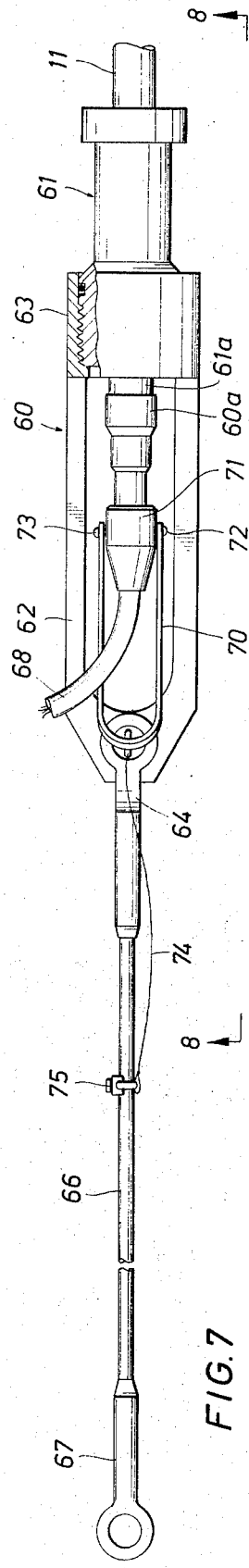
FIG. 7 is a top view partly in section of the connection between the cable assembly and the towing vehicle.
Figure 8:
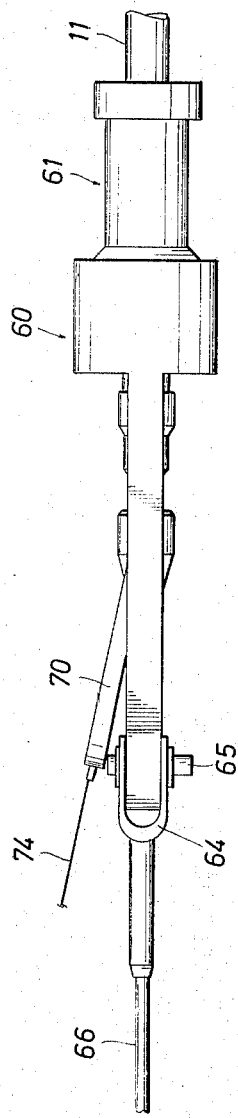
FIG. 8 is a side view looking in the direction of the arrows 8—8 of FIG. 7.

The cable assembly of this invention is further provided with means for connecting the cable assembly to a towing vehicle to drag the cable along the ground and move it from one position to another. In the embodiment shown, said means includes first and second connector sections 60 and 61, as shown in FIGS. 7 and 8. Connector section 61 is identical to connector section 23 of the connector described above and shown in FIGS. 4, 5, and 6. Connector section 60 includes yoke member 62 that is connected to internally threaded cylindrical member 63. Member 63 is designed to engage the threads on the external surface of the housing of connector section 61 in the same way that sleeve 40 engaged the threads on housing 41 of connector section 23 of the connector described and shown in FIG. 4. Clevice 64 is connected to yoke 62 by shear pin 65 that extends through the forward end of the yoke and through both sides of clevice 64. The clevice is connected to a towing vehicle, such as truck 10, through tow cable 66 and trailer hitch 67, only one-half of which is shown in the drawing. Shear pin 65 is designed to fail when the load on the towing vehicle, i.e., the drag imposed on the vehicle by the cable, reaches a predetermined amount. This is to prevent the cable from being damaged should it hang up unexpectedly. Should this happen, shear pin 65 will fail and release the cable assembly from the towing vehicle before the towing vehicle can break something in the cable assembly. With this arrangement, if the cable assembly hangs up and the shear pin fails, all that is required is to free the cable assembly and replace shear pin 65. Then operations can proceed.

Connector section 60 includes means to electrically connect the conductors in the cable assembly to the towing vehicle, or more exactly, to recording instruments and the like carried by the towing vehicle. In the embodiment shown, connector section 61 is provided with half 61a of a pin type connector, such as pin section 39 of the electrical connector used with the cable connector of FIG. 4. Connector section 60 includes a mating female or socket connector section 60a that mates with connector half 61a and connects the electrical conductors in cable 68 to the electrical conductors in the cable assembly.

In order to prevent damage to the electrical conductors of the cable when shear pin 65 fails, means are provided to disconnect the electrical connection at the same time. In the embodiment shown, U-shaped member 70 is pivotally connected on opposite sides of seal housing 71 by pins 72 and 73. Seal housing 71 encloses the seals (not shown) that engage the outer sheath of cable 68 to seal the electrical connections between the conductors in cable 68 and the socket section 60a of the connector, from the atmosphere. U-shaped member 70 is connected to tow cable 66 by flexible line 74, which has one end attached to cable clamp 75 attached to the tow cable. With this arrangement, when shear pin 65 fails and tow line 66 continues forward leaving the cable assembly and connector section 60 behind, line 74 through U-shaped member 70 will pull socket section 60a of the electrical connector out of engagement with pin section 61a thereby disconnecting the electrical conductors without damage to the electrical conductors in either the cable assembly or cable 68.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the apparatus and structure of this invention without departing from the scope thereof, it is to be understood that all matter herein set forth or shown in the accompanying drawings is to be interpreted as illustrative and not in a limiting sense.

The invention having been described, what is claimed is:

1. A seismic cable assembly for moving from one position to another by dragging the assembly along the ground, comprising a plurality of electrical conductors and a tensile member, connecting means for connecting the adjacent ends of the lengths of cable including means for electrically connecting the electrical conductors in the two lengths and means to connect the tensile members to transmit the force of moving the trailing length to the tensile member of the pulling length, a plurality of geophones connected to the cable assembly cable for movement with the cable assembly as it is dragged along the ground, and means for connecting the cable assembly to a towing vehicle to drag the cable along the ground and move it from one position to another, said means including first and second connection sections, said first section being connected to the tensile member of the end of the cable length adjacent the towing vehicle, means connecting the first and second sections to transmit the drag of the cable assembly from the tensile member of the cable length adjacent the towing vehicle to the second section, and means for connecting the second section to the towing vehicle, said means including frangible means that will fail when the cable drag reaches a predetermined amount and release the cable assembly from the towing vehicle, said frangible means including means connecting the electrical conductors of the cable assembly to the towing vehicle and means for disconnecting said electrical connecting means without damage to the electrical conductors when the frangible means fails releasing the connectors between the cable assembly and the towing vehicle.

2. A seismic cable assembly for moving from one position to another by dragging the assembly along the ground, comprising a plurality of lengths of cable, each length having a plurality of electrical conductors and a tensile member, connecting means for connecting the adjacent ends of the lengths of cable including means for electrically connecting the electrical conductors in the two lengths, said connecting means including first and second connector sections, each section including a housing into which one of said cable length extends, means for connecting the housing to the tensile member of the cable length extending therein to transmit between them all tensile forces imposed thereon, and means for connecting the two connector sections, and a plurality of geophones connected to the cable assembly cable for movement with the cable assembly as it is dragged along the ground.

3. The cable assembly of claim 2 in which the connecting means includes an outer sheath that encloses the connecting means to provide a streamlined outer surface to engage and slide along the ground as the cable is moved from position to position.

4. A seismic cable assembly for moving from one position to another by dragging the assembly along the ground, comprising first and second lengths of cable, each length having a plurality of electrical conductors and a tensile member, connecting means for connecting the adjacent ends of the lengths of cable including means for electrically connecting the electrical conductors in the two lengths and means to connect the tensile members to transmit the force of moving the trailing length to the tensile member of the pulling length, a plurality of geophones connected to the cable assembly for movement with the cable assembly as it is dragged along the ground, and means for connecting the first length to a towing vehicle, means connecting the first and second lengths to transmit the drag of the second length from the tensile member of the second length to the first length, and means for connecting the first length to the towing vehicle, said means including frangible means that will fail when the cable drag reaches a predetermined amount and release the cable assembly from the towing vehicle, said frangible means including means connecting the electrical conductors of the cable assembly to the towing vehicle and means for disconnecting said electrical connecting means without damage to the electrical conductors when the frangible means fails releasing the connectors between the cable assembly and the towing vehicle.

* * * * *